(12) United States Patent
Zhang

(10) Patent No.: US 8,306,156 B2
(45) Date of Patent: Nov. 6, 2012

(54) DATA AIDED DETECTION OF SPECTRUM INVERSION

(75) Inventor: Li Zhang, Xi'an (CN)

(73) Assignee: Montage Technology Group Limited, Grand Caymand (KY)

( * ) Notice: Subject to any disclaimer, the term of this patent is extended or adjusted under 35 U.S.C. 154(b) by 1203 days.

(21) Appl. No.: 11/873,923

(22) Filed: Oct. 17, 2007

(65) Prior Publication Data

US 2009/0103633 A1    Apr. 23, 2009

(51) Int. Cl.
*H03D 3/22* (2006.01)
(52) U.S. Cl. ........ 375/329; 375/240; 375/340; 375/326; 375/324; 455/3.01
(58) Field of Classification Search .............. 375/240.26, 375/329

See application file for complete search history.

(56) References Cited

U.S. PATENT DOCUMENTS

| | | | |
|---|---|---|---|
| 5,287,067 A * | 2/1994 | Denno et al. .................. | 329/304 |
| 6,456,672 B1 | 9/2002 | Uchiki et al. | |
| 7,281,192 B2 | 10/2007 | Shen et al. | |
| 7,411,995 B2 * | 8/2008 | Kasher et al. ................. | 375/141 |
| 2005/0123073 A1 | 6/2005 | Ginesi et al. | |
| 2005/0169400 A1* | 8/2005 | Chouly et al. ................ | 375/295 |
| 2006/0098751 A1 | 5/2006 | Zhang et al. | |
| 2006/0270337 A1* | 11/2006 | Ibrahim et al. ............... | 455/3.01 |

FOREIGN PATENT DOCUMENTS

CN        100527795 C        8/2009

OTHER PUBLICATIONS

WO96/41427 (Chalmers) Dec. 19, 1996, Entire document, Claims 3-4, 7-20.
DVB-S2 specification, ETSI EN 302 307 V1.1.1 (Mar. 2005).
Steven A. Tretter, "Estimating the frequency of a noisy sinusoid by linear regression", IEEE Transactions on information theory, vol. IT-31, No. 6, Nov. 1985, pp. 832-835.
Steven Kay, "A fast and accurate single frequency estimator", Acoustics, Speech, and Signal Processing [see also IEEE Transactions on Signal Processing], IEEE Transactions on vol. 37, Issue 12, Dec. 1989, pp. 1987-1990.
Feng-Wen Sun, Yimin Jiang and Lin-Nan Lee, "Frame synchronization and pilot structure for DVB-S2", International Journal of Satellite Communications and Networking, Int. J. Satell. Commun. Network. 2004; 22:319-339 to IJSC.
Jiang Y, et al., "Data-aided ML parameter estimators of PSK burst modems and their systolic VLSI implementations", In Proceedings of the IEEE Globecom'99, Rio de Janeiro, Brazil, Dec. 1999.

* cited by examiner

*Primary Examiner* — Lihong Yu
(74) *Attorney, Agent, or Firm* — Ivy Mei; The Law Office of Ivy Mei

(57) ABSTRACT

Methods and apparatuses to detect spectrum inversion based on estimated frequency offset in carrier signal. In one embodiment, a receiver includes an I/Q swap module to output an in-phase component and a quadrature-phase component; a frequency offset estimator to determine an offset in carry frequency of the in-phase and quadrature-phase components; and a spectrum inversion detector coupled to the frequency offset estimator and the I/Q swap module. The spectrum inversion detector is configured to signal the I/Q swap module to swap the in-phase component and the quadrature-phase component when an absolute value of the offset in carry frequency is above a predetermined threshold.

16 Claims, 6 Drawing Sheets

DATA AIDED DETECTION OF SPECTRUM INVERSION

FIELD OF THE TECHNOLOGY

At least some embodiments of the disclosure relate to detection of spectrum inversion in receivers in general and, particularly but not limited to, receivers for Second Generation Satellite Digital Video Broadcasting (DVB-S2).

BACKGROUND

A digital receiver typically includes an analog front-end and a digital circuit part. The analog front-end typically includes a radio frequency (RF) tuner, which converts an radio frequency (RF) signal down to a baseband signal, filters the signal, and makes appropriate power adjustment to remove out-band signal power and ensure the signal amplitude is at a suitable level.

In the digital receiver, the analog baseband signal output from the radio frequency (RF) tuner is sampled and quantified by an Analog Digital Converter (ADC) to generate digital signals for processing by the digital circuit part of the digital receiver. The digital receiver may perform various processing tasks, such as digital filtering, sample rate conversion, symbol timing synchronization, carrier synchronization, frame synchronization and forward error correction, etc., to recover the data from the received signal.

In a typical digital receiver for Second Generation Satellite Digital Video Broadcasting (DVB-S2), the spectrum inversion status is decided by a Forward Error Correction (FEC) module, which calculates the Bit Error Rate (BER) and determines whether the spectrum inversion has occurred based on the calculated Bit Error Rate (BER). For example, if the Bit Error Rate (BER) is outside a reasonable range, the spectrum can be considered to be inverted; otherwise, the spectrum can be considered to be not inverted. When the spectrum is inverted, the time period for the digital receiver to reach a locked working state will be quite long.

SUMMARY OF THE DESCRIPTION

Methods and apparatuses to detect spectrum inversion based on estimated frequency offset in carrier signal are described herein. Some embodiments are summarized in this section.

In one aspect, a Second Generation Satellite Digital Video Broadcasting (DVB-S2) receiver according to one embodiment includes: a tuner to provide an analog input signal; an analog to digital converter to generate a digital signal from the analog input signal, where the digital signal includes an in-phase component and a quadrature-phase component; an I/Q swap module to swap the in-phase component and the quadrature-phase component; a direct digital synthesizer to generate a frequency shifted version of the in-phase component and the quadrature-phase component; a frequency offset estimator to determine a frequency offset in the frequency shifted version of the in-phase component and the quadrature-phase component based on known symbols in a header of a frame; and a spectrum inversion detector coupled to the frequency offset estimator to determine whether to instruct the I/Q swap module to swap the in-phase component and the quadrature-phase component based on the frequency offset generated by the frequency offset estimator.

In one embodiment, the spectrum inversion detector instructs the I/Q swap module to swap the in-phase component and the quadrature-phase component when the absolute value of the frequency offset is above a predetermined threshold.

In one embodiment, the known symbols include a plurality of symbols for a start of frame (SOF) block of the frame.

In one embodiment, the known symbols further include a plurality of symbols decoded from a physical layer signaling code block of the frame.

In one embodiment, the spectrum inversion detector instructs the I/Q swap module to swap the in-phase component and the quadrature-phase component when an absolute value of the frequency offset normalized by a symbol rate is above 0.25.

In one embodiment, the frequency offset estimator is a feed-forward frequency estimator. Other types of frequency estimators can also be used.

In another aspect, a receiver according to one embodiment includes: an I/Q swap module to output an in-phase component and a quadrature-phase component; a frequency offset estimator to determine an offset in carry frequency of the in-phase and quadrature-phase components; and a spectrum inversion detector coupled to the frequency offset estimator and the I/Q swap module. The spectrum inversion detector is configured to signal the I/Q swap module to swap the in-phase component and the quadrature-phase component when an absolute value of the offset in carry frequency is above a predetermined threshold.

In one embodiment, a frame synchronizer is coupled to the frequency offset estimator to synchronize a plurality of known symbols with corresponding symbols in the in-phase and quadrature-phase components of a physical layer header.

In one embodiment, the frequency offset estimator includes: a modulation removal module to generate a modulation removed signal from multiplying signals generated from the known symbols and signals generated from the received in-phase and quadrature-phase components; and a frequency estimator to determine a frequency value of the modulation removed signal.

In one embodiment, a direct digital synthesizer is configured to generate the signals from the received in-phase and quadrature-phase components.

In a further aspect, a receiver according to one embodiment includes: a frequency offset estimator; and a spectrum inversion detector coupled to the frequency offset estimator to determine whether spectrum inversion has occurred based on an output of the frequency offset estimator.

In one embodiment, the frequency offset estimator and the spectrum inversion detector use known symbols modulated in a π/2 Binary Phase-Shift Keying (BPSK) mode in an input signal to determine whether spectrum inversion has occurred in the input signal.

In one embodiment, an I/Q swap module is configured to swap in-phase component and quadrature-phase component based on an output of the spectrum inversion detector.

In one embodiment, an analog to digital converter is coupled with the I/Q swap module to provide digital signals to the I/Q swap module. In one embodiment, additional modules may be coupled between the analog to digital converter and the I/Q swap module.

In one embodiment, the spectrum inversion detector includes a comparator to compare the absolute value of the output of the frequency offset estimator and a predetermine threshold. When the absolute value of the output of the frequency offset estimator is larger than the predetermined threshold, the comparator generates a signal to indicator that spectrum inversion has occurred.

In one embodiment, the frequency offset estimator includes: a modulation removal module to generate a modulation removed signal from received signals and signals generated from known data; and an autocorrelator to an autocorrelation of the modulation removed signal; an accumulator to accumulate an output of the autocorrelator over a plurality of frames; and a phase detector to generate an estimated frequency offset based on a phase of an output of the accumulator.

In one embodiment, a direct digital synthesizer coupled with the I/Q swap module to receive input signals and coupled with the frequency offset estimator to provide the received signals to the modulation removal module. A timing recovery loop is used to determining symbol boundaries from the output of the direct digital synthesizer. The predetermined threshold is based on a tolerance level of the timing recovery loop.

In one embodiment, the known data includes known symbols in a physical layer header of a frame.

In one embodiment, the received signals are modulated via phase shift keying (PSK).

In one embodiment, an input signal to the receiver is in accordance with a standard for Second Generation Satellite Digital Video Broadcasting (DVB-S2).

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the disclosure are not necessarily references to the same embodiment; and, such references mean at least one.

In a digital receiver for Second Generation Satellite Digital Video Broadcasting (DVB-S2), various modules can reach a locked working state even when the spectrum of the received signal is inverted. If these modules enter the locked state within a period of time but the Bit Error Rate (BER) calculated by the Forward Error Correction (FEC) module is still too high, the Forward Error Correction (FEC) (or the system controller) can conclude that spectrum inversion occurred in the signal and thus inform a module to swap the in-phase (I) and quadrature-phase (Q) data in an appropriate place of the data path to eliminate spectrum inversion. The locked modules are reset to restart the process of reaching the locked state.

One embodiment of the disclosure implements a Spectrum Inversion Detector in the carrier frequency offset estimation module. During the course of carrier frequency offset estimation, the Spectrum Inversion Detector can detect whether the spectrum was inverted. In one embodiment, the spectrum inversion detector monitors the calculation result from the frequency offset estimation module to decide whether the spectrum was inverted.

In one embodiment, when the Spectrum Inversion Detector determines that the spectrum was inverted, the Spectrum Inversion Detector informs the I/Q swap module to correct the spectrum inversion and, at the same time, informs the frequency offset estimation module to re-estimate the carrier frequency offset for the inversion-corrected signal using the already acquired data.

One embodiment of the disclosure includes a data aided (DA) spectrum inversion detection method for digital receiver. A joint data aided (DA) carrier estimation and spectrum inversion detection method is presented for digital receivers. The data aided method can estimate the frequency offset and determine the spectrum inversion status prior to a Forward Error Correction (FEC) module reaching a locked state in the digital receiver.

Figure 1:
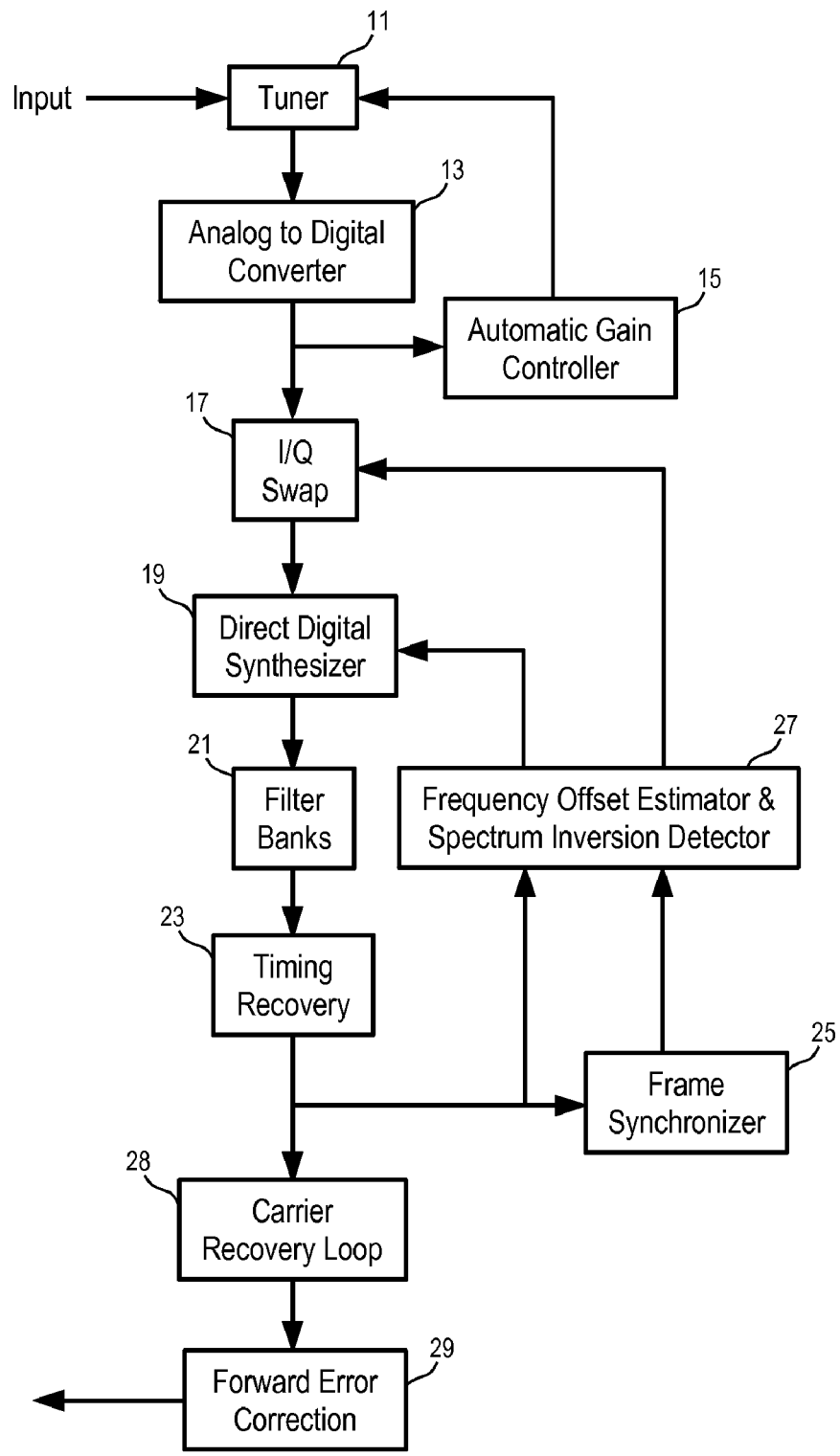
FIG. 1 shows a receiver according to one embodiment.

FIG. 1 shows a receiver according to one embodiment. In FIG. 1, the receiver includes a tuner (11) which converts the received radio frequency (RF) into a baseband signal. The baseband signal is converted into digital signal by the analog to digital converter (13). An automatic gain controller (15) is used to adjust the signal amplitude to a suitable level.

The output of the analog to digital converter (13) includes an in-phase (I) component and a quadrature-phase (Q) component. In FIG. 1, an I/Q swap module (17) can be instructed by the spectrum inversion detector to swap the in-phase (I) component and the quadrature-phase (Q) component to correct spectrum inversion.

In FIG. 1, the in-phase (I) component and the quadrature-phase (Q) component of the received signals are used by the direct digital synthesizer (19) to generate a frequency shifted version of the in-phase (I) component and the quadrature-phase (Q) component according to the frequency offset value estimated by the frequency offset estimator (27). After the frequency shifted version of the in-phase (I) component and the quadrature-phase (Q) component is filtered by the filter banks (21), the timing recovery module (23) identifies the timing of the received signals and determines the symbols in the received signal. The frame synchronizer (25) identifies the boundary of the frames in the signals received in the receiver and synchronizes the operation of the frequency offset estimator and spectrum inversion detector (27) with the frame structure in the received signal.

In FIG. 1, the frequency offset estimator and spectrum inversion detector (27) controls the direct digital synthesizer (19) using the estimated offset in carrier frequency; and the frequency offset estimator and spectrum inversion detector (27) controls the I/Q swap module (17) according to the spectrum inversion status.

In FIG. 1, the carrier recovery loop (28) recovers the carrier of the received signal; and the forward error correction (29) calculates the Bit Error Rate (BER) to detect error.

Figure 2:
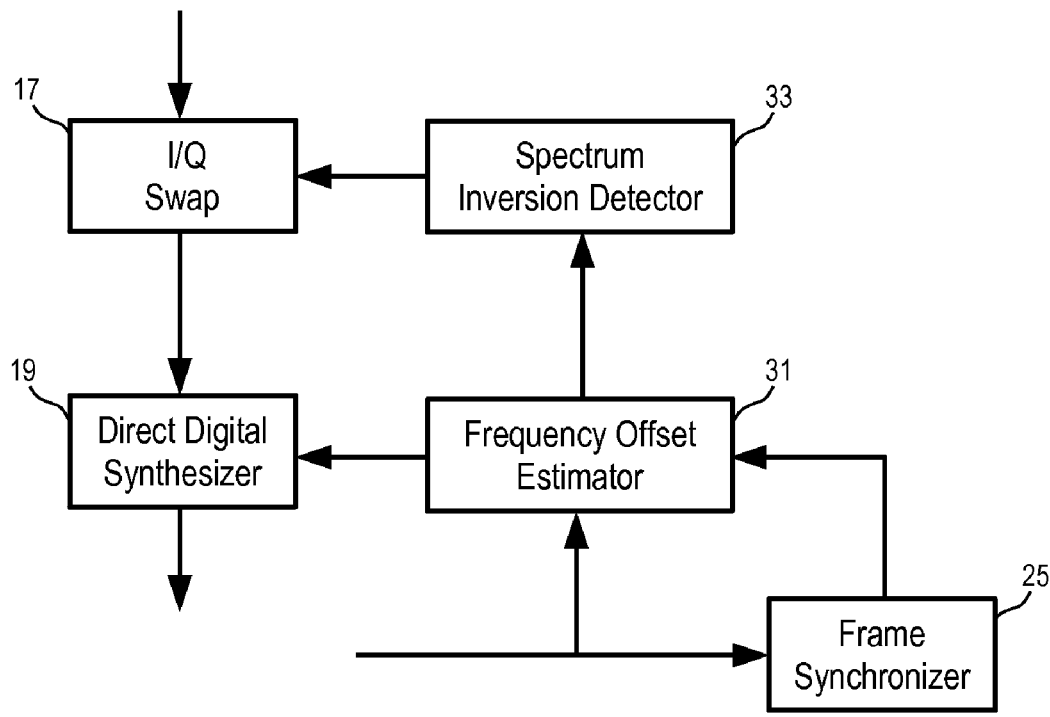
FIG. 2 shows a method to detect spectrum inversion according to one embodiment.

FIG. 2 shows a method to detect spectrum inversion according to one embodiment. In FIG. 2, the in-phase (I)

component and the quadrature-phase (Q) component in the received signal are used in frequency offset estimation module (31) to estimate the offset in carrier frequency and used in the frame synchronizer (25) to generate synchronization signal to control the operation of the frequency offset estimation module (31). In one embodiment, a known sequence of symbols relative to a frame boundary in the received signal is used in the frequency offset estimation module (31) to aid the estimation of the offset. The estimated offset in carrier frequency is used to control the direct digital synthesizer (19).

In FIG. 2, the estimated offset in carrier frequency is also used to in the spectrum inversion detector (33) to determine the status of spectrum inversion. If inversion is detected, the I/O swap module (17) is instructed to swap the in-phase (I) component and the quadrature-phase (Q) component for subsequently received signal.

Figure 3:
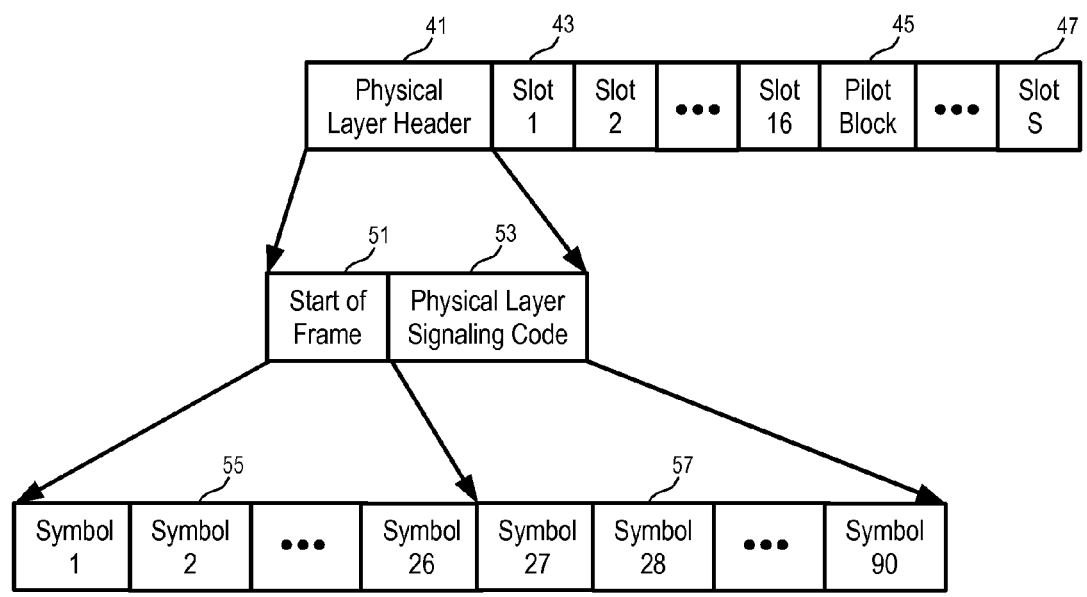
FIG. 3 illustrates a frame structure which supports spectrum inversion detection according to one embodiment.

FIG. 3 illustrates a frame structure which supports spectrum inversion detection according to one embodiment. In FIG. 3, a frame includes a physical layer header (41) and a plurality of data slots (e.g., 43, 47). In some embodiments, a frame may include an optional pilot block (45) that includes known sequence of symbols to speed up the frame synchronization process.

In FIG. 3, the physical layer header (41) includes a Start of Frame (SOF) block (51) and a block (53) for physical layer signaling code. The Start of Frame (SOF) block (51) includes a sequence of known symbols (e.g., 55), which can be used for frame synchronization. The symbols for physical layer signaling code (e.g., 57) can be decoded after frame synchronization is achieved.

In FIG. 3, the physical layer header (41) has 90 symbols; and the Start of Frame (SOF) block (51) has 26 symbols.

A signal transmitted using a frame structure illustrated in FIG. 3 can be received and processed using receivers according to various embodiments of the disclosure. For example, a signal transmitted according to a standard for Second Generation Satellite Digital Video Broadcasting (DVB-S2) can be received and processed using receivers according to various embodiments of the disclosure.

In Second Generation Satellite Digital Video Broadcasting (DVB-S2), data messages are transmitted on a frame-by-frame basis. Frame structures are defined in detail; and each frame includes a 90-symbol header and a data part. The frame header includes a 26-symbol SOF (Start of Frame) constant flag and a 64-symbol Physical Layer Signaling (PLS) code. The Physical Layer Signaling (PLS) code depends on the modulation mode and the channel encoding scheme. In one embodiment, the 90 symbols in the frame header are modulated in a $\pi/2$ BPSK mode, which can be used to estimate carry frequency offset and determine spectrum inversion status.

Further, in embodiment, when a pilot block (e.g., 45) is used, the signal corresponding to the pilot block can also be used with the know symbols of the pilot block to estimate carry frequency offset.

Figure 4:
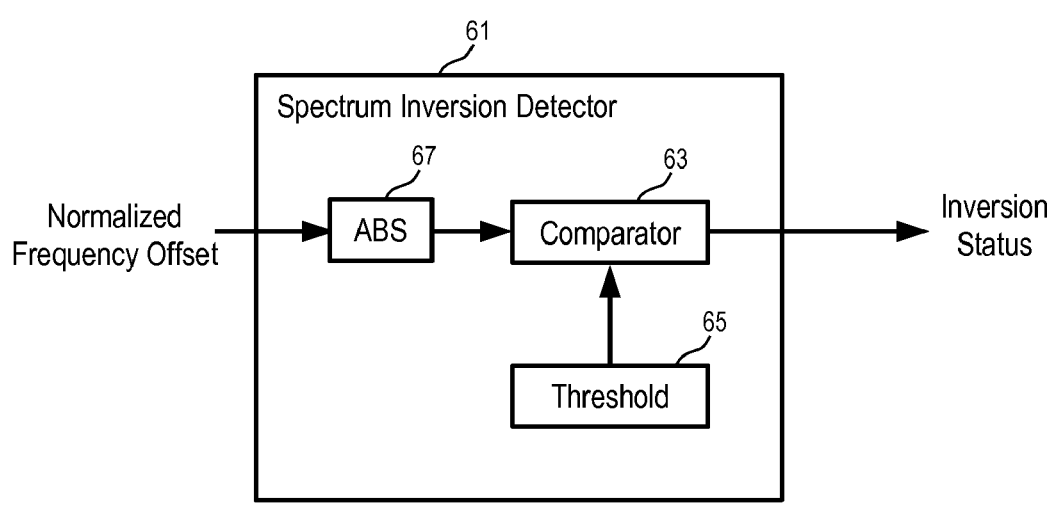
FIG. 4 illustrates a spectrum inversion detector according to one embodiment.

FIG. 4 illustrates a spectrum inversion detector according to one embodiment. In FIG. 4, the spectrum inversion detector (61) includes an absolute module (67), a comparator (63) and a predetermined threshold (65). When the absolute value of the carry frequency offset, normalized by the symbol rate transmitted in the received signal, is less than the threshold (65), the comparator (63) generates a signal to indicate that no spectrum inversion occurred. When the absolute value of the normalized carry frequency offset is larger than the threshold (65), the comparator (63) generates a signal to indicate that spectrum inversion occurred.

In one embodiment, the threshold (65) is a predetermined value of 0.25. However, it is understood that a threshold value deviating from the predetermined value of 0.25 can also be used in some embodiments.

In one embodiment, the threshold (65) is selected based at least in part on the tolerance level of the timing recovery loop (e.g., 23 in FIG. 1). The timing recover loop can find and track symbol boundaries even when the input signal contains a carrier frequency offset up to the tolerance level. The threshold (65) can be set to be substantially equal to the tolerance level. Alternatively, the threshold (65) can be selected to have an offset to the tolerance level. In one embodiment, when the threshold (65) is equal to the tolerance level of the timing recovery loop, the system is configured at a balance point for missed detection of spectrum inversion and false detection of spectrum inversion. When the threshold is increased from the threshold value, missed detection of spectrum inversion increases. When the threshold is decreased from the threshold value, false detection of spectrum inversion increases. In general, the threshold (65) is a design parameter having a value between 0 and 0.5.

Figure 5:
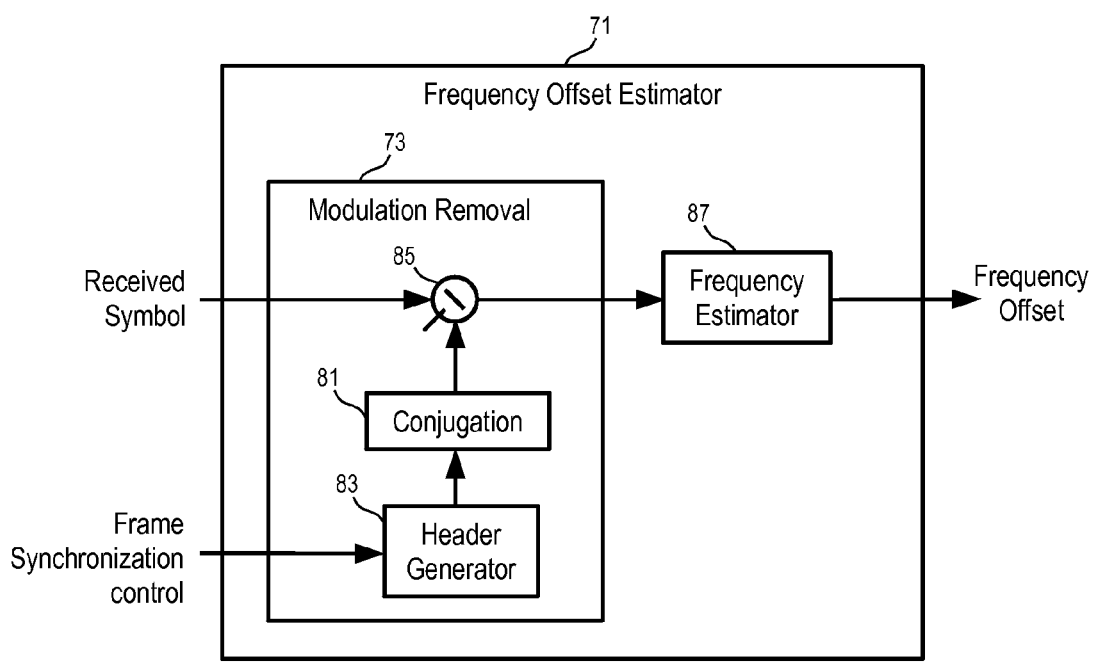
FIG. 5 illustrates a frequency offset estimator which can be used with a spectrum inversion detector according to one embodiment.

FIG. 5 illustrates a frequency offset estimator which can be used with a spectrum inversion detector according to one embodiment. In FIG. 5, the frequency offset estimator (71) includes a modulation removal module (73), which includes a header generator (83), a conjugation module (81) and a multiplier (85). The header generator (83) generates the header according to known symbols in the header and the signal for frame synchronization control. The multiplier (85) multiplies the received symbols with the conjugate of the known symbols in the header to generate a modulation removed signal.

Figure 6:
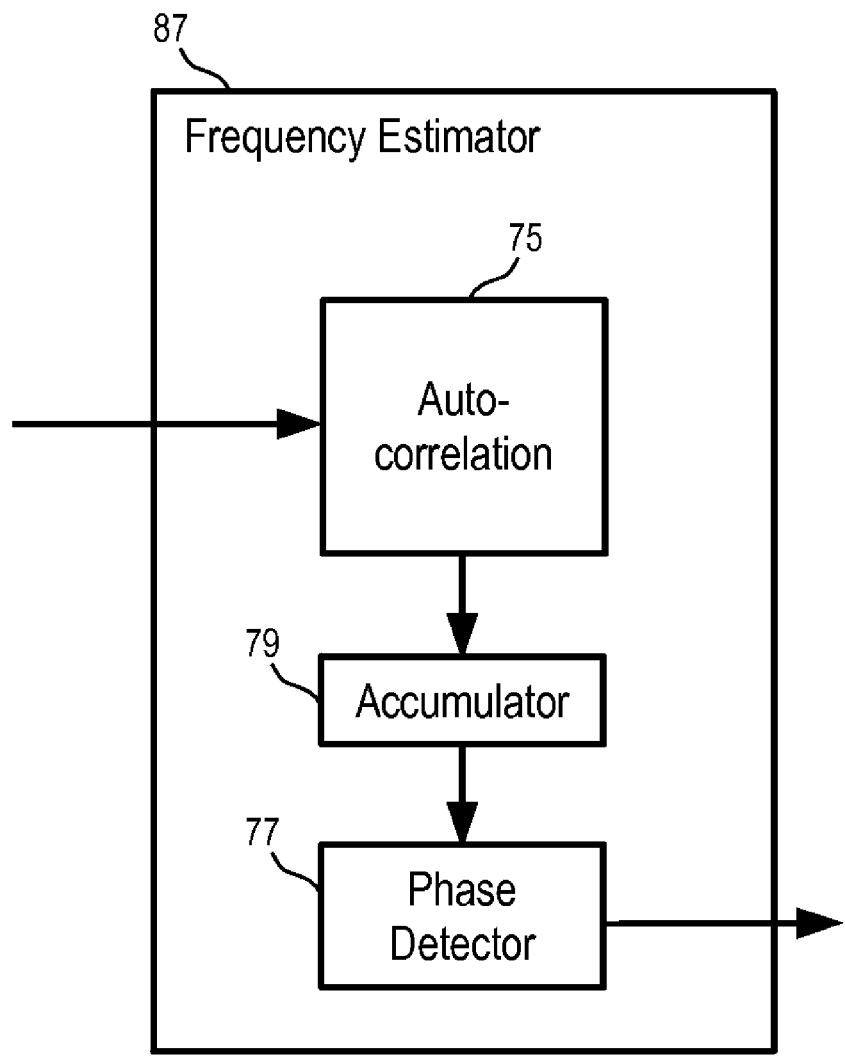
FIG. 6 illustrates a frequency estimator according to one embodiment.

In FIG. 5, the frequency estimator (83) determines the frequency of the modulation removed signal generated by the modulation removal module (73). In general, any known methods to estimate the frequency of a complex sine wave can be used. FIG. 6 illustrates a frequency estimator according to one embodiment.

In FIG. 5, the header generator (83) generates the known symbols in the header in a way synchronized with the received symbols according to the control signal generated from the frame synchronization module (e.g., 25 in FIG. 2). In one embodiment, the known symbols include the symbols in the Start of Frame (SOF) block (51). In one embodiment, the known symbols further include the symbols in the block (53) for physical layer signaling code, after the physical layer signaling code is decoded.

In one embodiment, the modulation removal module (73) performs the following operation to generate the modulation removed signal $C_k$.

$$C_k = r_k \times conj(s_k)$$

In the above expression, $s_k$ is the signal generated according to the known symbols; $conj(s_k)$ is the conjugate of $s_k$; and $r_k$ is the signal containing the received symbols, where $k=0, 1, 2, \ldots$.

In FIG. 6, the input signal to the frequency estimator is enhanced by the autocorrelation module (75) and further accumulated in the accumulator (79) to improve accuracy. The phase detector (77) determines the phase of the accumulator (79) to generate the estimated frequency offset in carrier.

For example, the autocorrelation module (75) may perform the following operation to generate signal $R_s$ for frame s.

$$R_s = C_m \times conj(C_0) + C_{m+1} \times conj(C_1) + \ldots + C_{N-1} \times conj(C_{N-m-1})$$

In the above expression, m is a design parameter, which can be 1, or 2, etc. N is based on the number of known symbols in the frame (e.g., 26 or less if the Physical Layer Signaling (PLS) code is not yet decoded, or 90 or less if the Physical Layer Signaling (PLS) code has already been decoded).

For example, the accumulator (79) may perform the following operation to generate the accumulated signal R.

$$R=R_0+\ldots R_s+\ldots +R_M$$

In the above expression, M is a design parameter, which can be 1, or 2, etc.

In one embodiment, the phase detector (77) performs the following operation to generate the normalized frequency offset Δf.

$$\Delta f = arg(R)/2\pi$$

In the above expression, arg(R) is the phase angle of R. In one embodiment, the absolute value of the normalized frequency offset, |Δf|, is compared to the threshold value (e.g., 0.25) to determine the status of spectrum inversion.

In one embodiment, the symbols are modulated in a π/2 BPSK mode; and it can be determined that when |Δf|>0.25 the probability of spectrum inversion is close to 1.

Further details about frequency offset estimators that can be used with the present invention can be found in: Steven A. Tretter, "Estimating the frequency of a noisy sinusoid by linear regression, IEEE Transactions on information theory, Vol. IT-31, No. 6, November 1985, pages 832-835; Steven Kay, "A fast and accurate single frequency estimator, Acoustics, Speech, and Signal Processing [see also IEEE Transactions on Signal Processing, IEEE Transactions on Volume 37, Issue 12, December 1989, pages 1987-1990; Feng-Wen Sun, Yimin Jiang and Lin-Nan Lee, "Frame synchronization and pilot structure for DVB-S2, International Journal of Satellite Communications and Networking, Vol. 22, 2004, pages 319-339; and Jiang Y, et al., "Data-aided ML parameter estimators of PSK burst modems and their systolic VLSI implementations, In Proceedings of the IEEE Globecom'99, Rio de Janeiro, Brazil, December 1999. The above references are hereby incorporated herein by reference.

Thus, the present disclosure presents a scheme which can be used for a DVB-S2 digital receiver to detect spectrum inversion status at the same time of carrier recovery using a data aided method. In one embodiment, the spectrum inversion status can be reliably detected and corrected during the carrier frequency estimation phase. The spectrum inversion status can be detected in an earlier stage without having to wait for the Bit Error Rate (BER) estimated by the Forward Error Correction (FEC) module. Further, the carrier frequency offset with the spectrum inversion correction can be estimated based on the data collected before the correction. Since the spectrum inversion is detected and processed in an early stage of the receiver, the average locking time for the receiver will be reduced when the spectrum inversion situation is unknown. This greatly reduces the waiting time for channel surfing, thus improving the user experience and making the product more competitive in the market.

Further, other reasons, such as cycle slip, may also cause the Forward Error Correction (FEC) module to fail in reaching a locked working state. Since the methods of the present disclosure do not rely on the Forward Error Correction (FEC) module, the spectrum inversion detection methods of the present disclosure can improve the reliability of spectrum inversion detection, in comparison with the methods of using the failure in the Forward Error Correction (FEC) module to detect spectrum inversion.

In the foregoing specification, the disclosure has been provided with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A receiver, comprising:
    a frequency offset estimator comprising a modulation removal module to generate a modulation removed signal from received signals and signals generated from known data; and
        an autocorrelator to perform an autocorrelation of the modulation removed signal;
        an accumulator to accumulate an output of the autocorrelator over a plurality of frames; and
        a phase detector to generate an estimated frequency offset based on a phase of an output of the accumulator;
    a spectrum inversion detector coupled to the frequency offset estimator to determine whether spectrum inversion has occurred based on an output of the frequency offset estimator, wherein the spectrum inversion detector comprises a comparator to compare an absolute value of the output of the frequency offset estimator and a predetermine threshold, and wherein when the absolute value of the output of the frequency offset estimator is larger than the predetermined threshold, the comparator generates a signal to indicate that spectrum inversion has occurred;
    an I/Q swap module to swap an in-phase component and a quadrature-phase component, based on an output of the spectrum inversion detector,
    a direct digital synthesizer coupled with the I/Q swap module to receive input signals and coupled with the frequency offset estimator to provide the received signals to the modulation removal module; and
    a timing recovery loop to determining symbol boundaries from an output of the direct digital synthesizer;
    wherein the predetermined threshold is based on a tolerance level of the timing recovery loop.

2. The receiver of claim 1, wherein the frequency offset estimator and the spectrum inversion detector use known symbols modulated in a π/2 Binary Phase-Shift Keying (BPSK) mode in an input signal to determine whether spectrum inversion has occurred in the input signal.

3. The receiver of claim 1, further comprising:
    an analog to digital converter coupled with the I/Q swap module to provide digital signals to the I/Q swap module.

4. The receiver of claim 1, wherein the known data comprises known symbols in a physical layer header of a frame.

5. The receiver of claim 4, wherein the received signals are modulated via phase shift keying (PSK).

6. The receiver of claim 5, wherein an input signal to the receiver is in accordance with a standard for Second Generation Satellite Digital Video Broadcasting (DVB-S2).

7. A Second Generation Satellite Digital Video Broadcasting (DVB-S2) receiver having a receiver as recited in claim 1, further comprising:
    a tuner to provide an analog input signal; and
    an analog to digital converter to generate a digital signal from the analog input signal, the digital signal comprising the in-phase component and the quadrature-phase component;
    wherein the direct digital synthesizer is configured to generate a frequency shifted version of the in-phase component and the quadrature-phase component;

wherein the frequency offset estimator is configured to determine a frequency offset in the frequency shifted version of the in-phase component and the quadrature-phase component based on known symbols in a header of a frame; and wherein the spectrum inversion detector is coupled to the frequency offset estimator to determine whether to instruct the I/Q swap module to swap the in-phase component and the quadrature-phase component based on the frequency offset generated by the frequency offset estimator.

8. The DVB-S2 receiver of claim 7, wherein the spectrum inversion detector instructs the I/Q swap module to swap the in-phase component and the quadrature-phase component when an absolute value of the frequency offset is above a predetermined threshold.

9. The DVB-S2 receiver of claim 7, wherein the known symbols comprise a plurality of symbols for a start of frame (SOF) block of the frame.

10. The DVB-S2 receiver of claim 9, wherein the known symbols further comprise a plurality of symbols decoded from a physical layer signaling code block of the frame.

11. The DVB-S2 receiver of claim 7, wherein the spectrum inversion detector instructs the I/Q swap module to swap the in-phase component and the quadrature-phase component when an absolute value of the frequency offset normalized by a symbol rate is above 0.25.

12. The DVB-S2 receiver of claim 7, wherein the frequency offset estimator comprises a feed-forward frequency estimator.

13. The receiver of claim 1:

wherein the frequency offset estimator is configured to determine an offset in carry frequency of the in-phase component and the quadrature-phase component; and wherein the spectrum inversion detector is coupled to the frequency offset estimator and the I/Q swap module, the spectrum inversion detector to signal the I/Q swap module to swap the in-phase component and the quadrature-phase component when an absolute value of the offset in carry frequency is above a predetermined threshold.

14. The receiver of claim 13, further comprising:

a frame synchronizer coupled to the frequency offset estimator to synchronize a plurality of known symbols with corresponding symbols in the in-phase component and the quadrature-phase component of a physical layer header.

15. The receiver of claim 14, wherein the frequency offset estimator further comprises:

a phase detector to determine a phase value of the modulation removed signal;

wherein the modulation removal module is configured to generate the modulation removed signal from multiplying signals generated from the known symbols and signals generated from the in-phase component and the quadrature-phase component.

16. The receiver of claim 15, wherein the direct digital synthesizer is configured to provide the received signals to the modulation removal module from the in-phase component and the quadrature-phase component.

\* \* \* \* \*